Nov. 5, 1929.    W. F. BENNETT    1,734,555
ANTIRATTLER AND FASTENER FOR VEHICLE DOORS
Filed Feb. 4, 1929
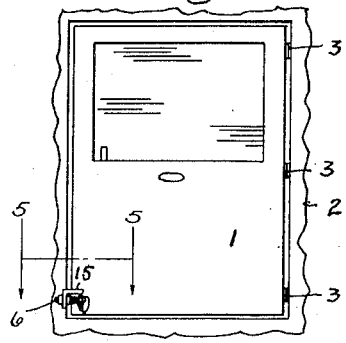
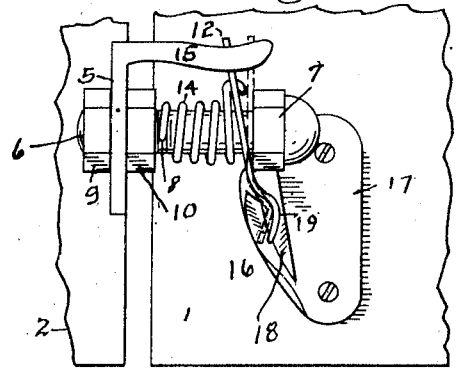
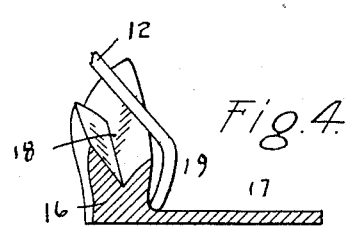
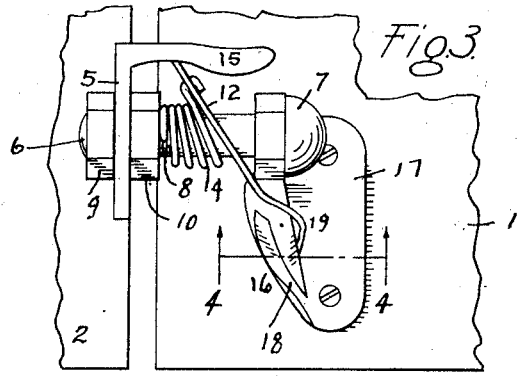
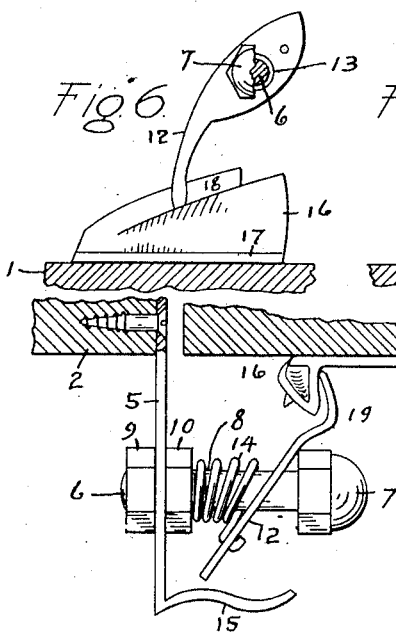
INVENTOR.
William F. Bennett
By Minturn & Minturn,
Attorneys.

Patented Nov. 5, 1929

1,734,555

UNITED STATES PATENT OFFICE

WILLIAM FRANCIS BENNETT, OF NEWCASTLE, INDIANA, ASSIGNOR TO GOODWIN BROTHERS AUTOMOBILE COMPANY, INC., OF NEWCASTLE, INDIANA, A CORPORATION OF INDIANA

ANTIRATTLER AND FASTENER FOR VEHICLE DOORS

Application filed February 4, 1929. Serial No. 337,203.

The object of this invention is to prevent movement and rattling of automobile and other vehicle doors due to the looseness of the door and unevenness of the road over which the vehicle is travelling.

I accomplish the above and other objects which will hereinafter appear, by the means illustrated in the accompanying drawing, in which Fig. 1 is an elevation viewed from the inside of the car, of a door and frame equipped with my invention.

Fig. 2 is a detail in elevation of the invention applied, in which the spring pressed lever is shown in dotted lines in its first position flat against the nut and in full lines in a canted position part way down the tightening cam.

Fig. 3 is a view similar to Fig. 2, with the spring pressed lever in final locking position.

Fig. 4 is a section of the lever positioned more plainly.

Fig. 5 is a section on the line 5—5 of Fig. 1, on a larger scale showing the invention in the top plan view; and Figs. 6, 7 and 8 illustrate the cooperation of the spring-pressed lever with the tightening cam.

Like characters of reference indicate like parts in the several views of the drawing.

In the drawing, 1 is the door of an automobile sedan or other car, and 2 is the frame in which it is mounted on hinges 3. It is secured by a lock not shown, the end of the handle of which is illustrated at 4 in Fig. 1. All of the above parts are of usual or suitable construction which do not form a part of this invention.

It is a very common thing for vehicle doors to sag and otherwise to become illfitting, loose and noisy and the purpose of my invention is to draw such door back to normal position and to hold it there from rattling.

To this end I provide a metal bracket 5 which is attached to the front upright of the door frame by screws, Fig. 5, or other suitable means. The bracket 5 supports a bolt 6, having a head 7 and opposite threaded end 8. The bolt is held adjustably as to the distance of the head from the bracket by two nuts 9 and 10, on each side of the bracket. A lever 12 has a hole 13, see Fig. 6, considerably larger in diameter than the diameter of the bolt, by which the lever is pivotally mounted on the bolt with sufficient looseness as to be capable of being tilted thereon. Mounted on the bolt 6 between the lever and nut 10 is a spirally wound spring 14, which normally holds the lever flat against the head 7 of the bolt, as shown by dotted lines in Fig. 2.

To keep the lever 12 from rotating on the bolt 6, I form an arm 15 laterally from the end of the bracket 5, and against this arm the lever strikes, to prevent the rotation of the lever. The opposite, inner, and long arm of the lever 12, cooperates with a catch-block 16, having a foot plate 17 which is fastened by screws to the door 1, as best shown in Figs. 2 and 3.

The block 16 is formed with a cam groove 18, which the inner end of the lever 12 enters when the block is brought in contact with the lever in the operation of closing the door.

The cam groove slopes downwardly and toward the hinge edge of the door with the result that the lever is tilted to compress the spring 14 by using the lower corner of the bolt head 7 as a fulcrum. The inner arm of lever 12 is bent into a hook 19 to increase the holding engagement of the end against the block, and the lower end of the cam groove discharges the hook-end of the lever against a straight face of the block also at right angles to the door favorable to drawing the door toward the front frame upright 2 by the action of the spring 14 against the lever 12, and, simultaneously, the action of the spring, tending to straighten the lever, takes up lost motion and prevents the rattling of the door in its frame.

The various figures of the drawing taken with the foregoing description make further explanation unnecessary.

While I have shown the best embodiment of my invention now known to me, it is capable of variations in structure and I therefore do not desire to be limited any more than is required by the appended claims.

I claim:

1. In an anti-rattler and fastener for hinged doors, a bolt having a head, means for supporting the bolt from the front vertical member of the door frame, a lever loosely mounted on the bolt, a spring normally holding the lever against the head of the bolt, a block fastened to the door to contact an end of the lever when the door is closed and swing the lever to an oblique position compressing the spring, said block having a cam groove directing the end of the lever to the side of the block toward the hinges of the door.

2. In an anti-rattler and fastener for hinged doors, a bolt having a head and a threaded end, a bracket supported by the front frame member of the door having a hole through which the threaded end of the bolt is inserted, nuts on the bolt on each side of the bracket, a lever mounted on the bolt by a hole which allows the lever to assume a position oblique to the axis of the bolt, a spirally wound spring on the bolt between the lever and adjacent nut, a block fastened to the door and contacting the lever when the door is closed to oblique the lever, said block having a cam groove directing an end of the lever to the side of the block next to the hinges of the door.

3. In an anti-rattler and fastener for hinged doors, a bolt having a head, a bracket supported by the front frame member of the door to which the bolt is fastened, said bracket having a lateral extension parallel with the bolt, a lever having a hole much larger in diameter than the diameter of the bolt, through which the bolt passes, a spring on the bolt pressing the lever normally flat against the head of the bolt in which position the extension on the bracket prevents rotation of the lever on the bolt, a block fastened to the door to contact an end of the lever by closing of the door and swing the lever obliquely to compress the spring, said block having a cam-groove directing the end of the lever to the side of the block next to the hinges of the door.

In testimony whereof I affix my signature.

WILLIAM FRANCIS BENNETT.